No. 889,948.  
PATENTED JUNE 9, 1908.
S. MOE.  
BELT OR APRON ADJUSTING OR SHIFTING MECHANISM.  
APPLICATION FILED JUNE 27, 1907.
3 SHEETS—SHEET 1.
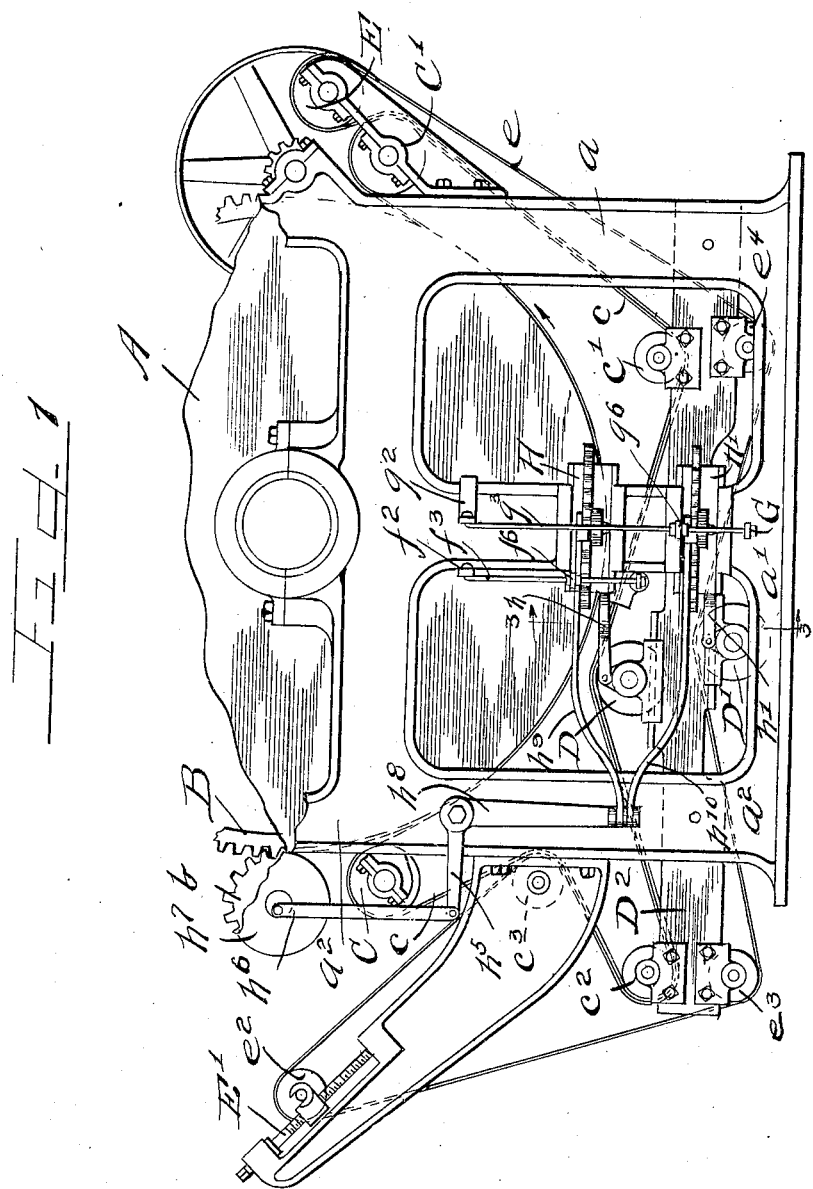

No. 889,948. PATENTED JUNE 9, 1908.
S. MOE.
BELT OR APRON ADJUSTING OR SHIFTING MECHANISM.
APPLICATION FILED JUNE 27, 1907.
3 SHEETS—SHEET 2.
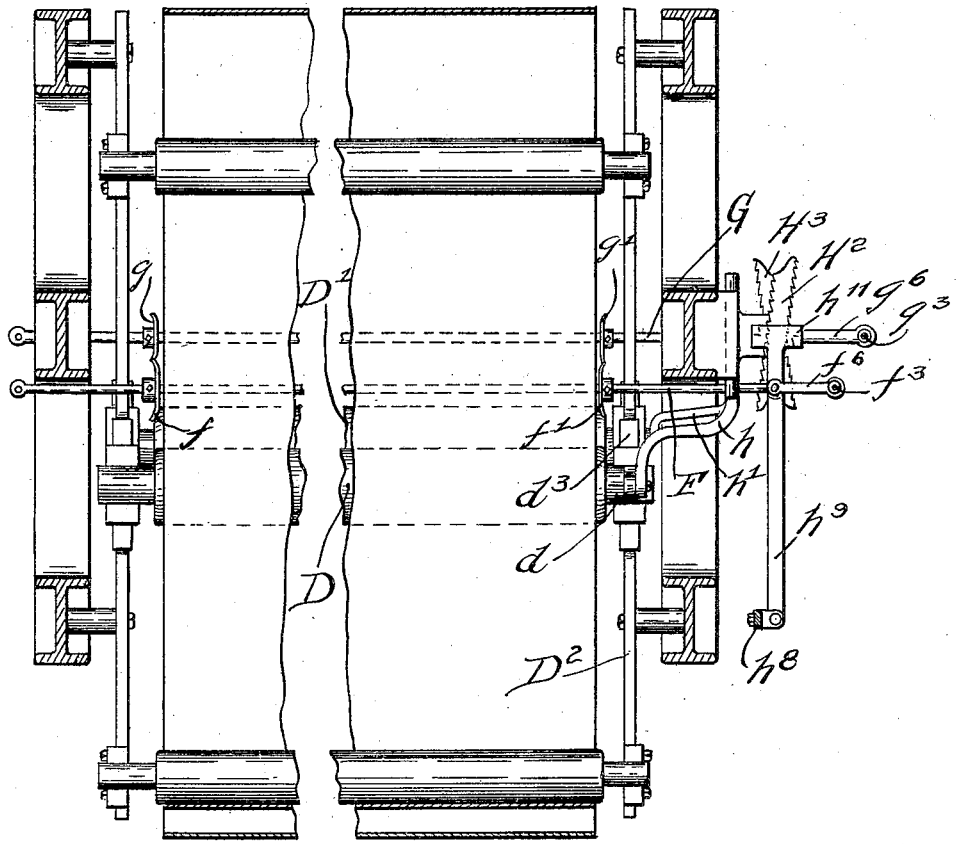
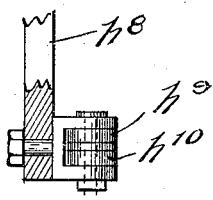
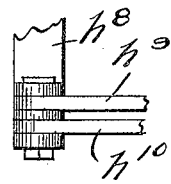

No. 889,948. PATENTED JUNE 9, 1908.
S. MOE.
BELT OR APRON ADJUSTING OR SHIFTING MECHANISM.
APPLICATION FILED JUNE 27, 1907.
3 SHEETS—SHEET 3.
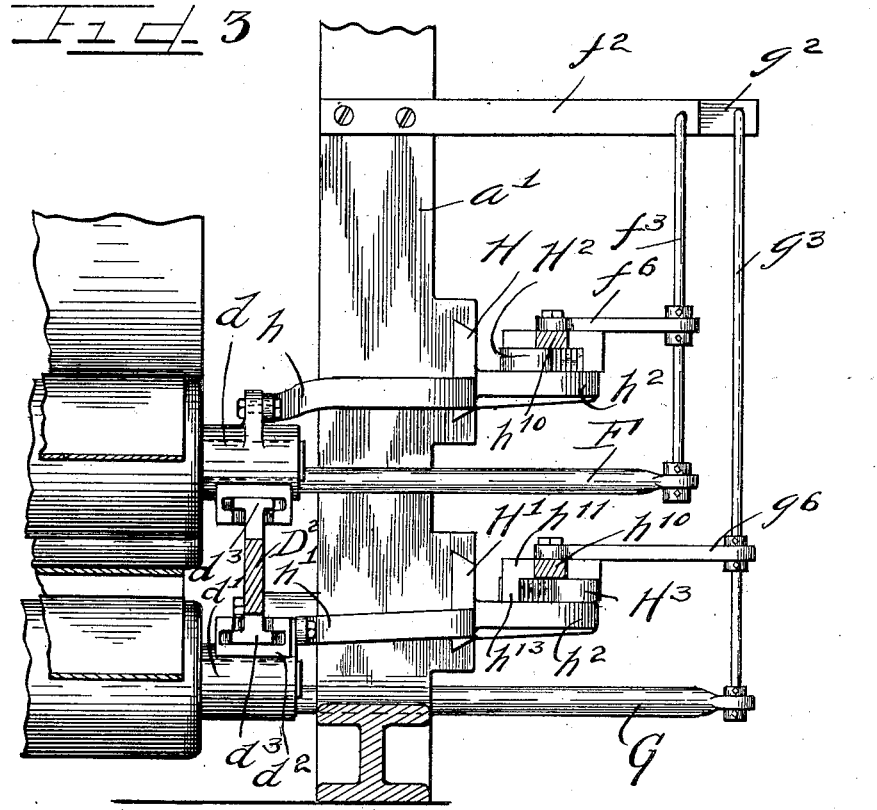
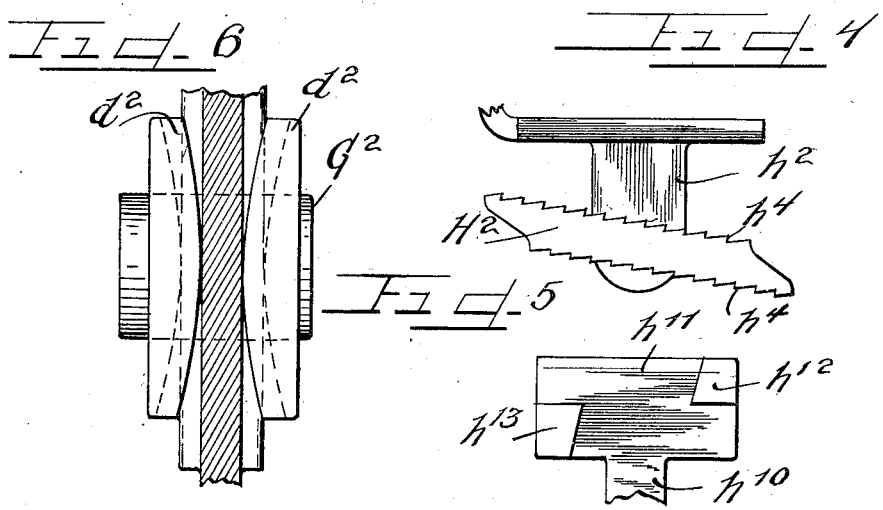
WITNESSES
INVENTOR
Sivert Moe
by Charles W. Fies
Atty.

UNITED STATES PATENT OFFICE.

SIVERT MOE, OF CHICAGO, ILLINOIS.

BELT OR APRON ADJUSTING OR SHIFTING MECHANISM.

No. 889,948.   Specification of Letters Patent.   Patented June 9, 1908.

Application filed June 27, 1907. Serial No. 381,041.

*To all whom it may concern:*

Be it known that I, SIVERT MOE, a citizen of the United States, and a resident of the city of Chicago, in the county of Cook and State of Illinois, have invented certain new and useful Improvements in Belt or Apron Adjusting or Shifting Mechanism; and I do hereby declare that the following is a full, clear, and exact description of the same, reference being had to the accompanying drawings, and to the letters of reference marked thereon, which form a part of this specification.

This invention relates to improvements in belt or apron adjusting or shifting mechanism and is shown embodied in connection with the endless apron or carrier, of a mangle to adjust the same true to its pulleys or rollers.

In all classes of machinery endless aprons and belts, to perform their functions satisfactorily, must run true whether used for driving mechanism or for carrying materials thereon, for instance as herein shown for conveying the articles through the mangle. In such constructions especially where fabrics and other yielding materials are carried upon such aprons, should the apron or belt not run true, serious injury is likely to be occasioned by either tearing the fabric or in some instances injuring the apron. Many different devices have been tried for the purpose of adjusting and guiding the apron or belt suitably upon its pulleys or rollers and such have sometimes been complicated and not wholly automatic in operation. In consequence they have usually required the almost constant attendance of a skilled employee occasioning considerable expense.

The object of this invention is to provide a guiding and adjusting mechanism wholly automatic in action and by means of which the adjustment of the apron or belt is quickly and accurately accomplished and stretching of the belting or apron is immediately compensated by corresponding adjustment.

Finally it is an object of the invention to afford an exceedingly cheap, simple and durable mechanism, the operation of which is wholly automatic and which in consequence prevents loss through injury of articles carried on the apron and injury to the apron and the machine itself.

The invention consists in the matters hereinafter described and more fully pointed out and defined in the appended claims.

In the drawings: Figure 1 is a fragmentary end elevation of a mangle provided with carrier belts and adjusting mechanism embodying my invention. Fig. 2 is a horizontal fragmentary section thereof. Fig. 3 is an enlarged fragmentary section taken on line 3—3 of Fig. 1. Fig. 4 is an enlarged detail of one of the ratchet adjusting bars. Fig. 5 is an enlarged face view of one of the reciprocating pawl heads which engages the same. Fig. 6 is an enlarged detail view of the slide bearing for the adjusting roller. Figs. 7 and 8 are details of pivotal connections for parts of the adjusting mechanisms.

As shown in the drawings: A mangle embracing a cylindric roll A, constructed as usual and journaled centrally on a frame comprising side standards $a$—$a'$—$a^2$ is provided with a gear at one end indicated by B which meshes with pinions $b$ at the ends of the co-acting smaller rolls of the mangle to rotate the same.

The mangle as shown is that shown in my prior application for patent filed Nov. 16th, 1906, Serial No. 343,678, though of course the construction is applicable to any mangle and many devices other than for the particular type and manner shown.

On opposite sides of the cylinder A, are followers or pulleys of the same length as said cylinder indicated by C and C' about which is carried a belt $c$ the upper lap of which bears against the under side of the mangle cylinder, both of which drive in the direction indicated by the arrow shown in Fig. 1. Said belt is driven from any suitable source of power applied to either of the rollers C or C' or by friction with the mangle cylinder A. Said belt from the roller C' leads downwardly beneath an idler roller $c'$, journaled on the frame between the standards $a$ and $a'$, thence slightly upwardly over the adjusting roller D, thence beneath and around the idler rollers $c^2$ and $c^3$, the latter shown in dotted lines in Fig. 1 and back around the roller C. Running in the same direction therewith about the pulley or roller E, is a belt $e$, which also pass beneath the idler $c'$ and the idler $c^2$ and $c^3$ and upwardly around the tightener pulley $e^2$, shown in Fig. 1, thence downwardly and around the pulley $e^3$ and over the adjusting pulley D' and beneath the idler pulley $e^4$, thence back to the pulley E. Said tightener pulley $e^2$ as shown is journaled in suitable boxes or bearings carried upon screw threaded shafts E' on each side the frame and whereby the belt $e$ may be tightened or its tension varied by rotation of the shaft. Said belts drive so that the adjacent or contacting faces thereof run in the same direction and of course of necessity at the same rate of speed carrying the mangled articles therebetween. Mechanism is provided for adjusting said belts or aprons true upon their pulleys or rollers to insure against side slip and operated by automatically shifting the adjusting rolls transversely the belt or apron.

The rods F and G extend transversely the machine and respectively beneath the lower run of the belts $c$ and $e$. On each of said rods as shown in Fig. 2 are rigidly secured adjustable shoes $g$—$g'$—$f$—$f'$ on opposite sides of said aprons or belts which are adjusted in close relation with the edges of said apron, so that should the belt or apron shift in either direction, the rods are shifted thereby transversely the machine. Said rods are supported at their ends on each side of the machine to swing transversely thereof by means of brackets $f^2$—$g^2$ which project beyond the side of the machine and from which depend pivotally supported rods, $f^3$—$g^3$ which respectively pivotally engage the extended end of said rods F and G to permit the same to swing with the movement of the belt.

Slidably secured in suitable slide recesses in the standard $a'$ in the middle of the side frame are slide bars H and H' which are respectively connected by means of rigid bars $h$ and $h'$ with the bearings $d$ and $d'$ of the adjusting rolls D and D' on that side of the frame so that movement of the slide acts to shift said rolls automatically with the belt or apron. Said bearings as shown for said ends of said adjusting rolls comprise each a suitable boxing $G^2$, rigidly secured to a grooved base $d^2$, which fits over and closely to the laterally extending head or flanged head $d^3$ of the horizontal frame member $D^2$ which is rigidly bolted to the legs of the side frame as shown in Fig. 1, and affords a support above and below the same respectively for said bearings, but permitting movement longitudinally the machine.

On a bracket $h^2$ integral with each of the slides H—H' is bolted a ratchet bar $H^2$ and $H^3$ respectively and arranged horizontally and obliquely with the edge of the apron as shown in Figs. 2 and 4 and each provided with serrations or teeth $h^4$ on opposite sides thereof which as shown are directed oppositely.

Pivotally supported on the standard $a^2$ or any suitable part of the frame, is a bell crank, one arm of which $h^5$ extends horizontally and the extremity is pivotally connected with a connecting rod $h^6$ the upper end of which is eccentrically engaged upon a pulley $h^7$ on the same shaft with the gear $b$ as shown in Fig. 1. The other end of said bell crank $h^8$ extends downwardly and is pivotally connected at its lower end as shown in Figs. 1 and 8, with rods $h^9$—$h^{10}$ which extend substantially parallel with the side of the machine and which are provided at their extremities with heads $h^{11}$ as shown in Figs. 3 and 5 each provided with inwardly directed oppositely disposed teeth $h^{12}$—$h^{13}$ adapted to engage respectively the ratchets on the sides of the ratchet bars $H^2$ or $H^3$. Said teeth $h^{12}$—$h^{13}$ are normally held out of engagement with the teeth $h^4$ of the ratchet bars by means of rods $f^6$—$g^6$ which pivotally engage the bars $f^3$ and $g^3$, supporting the ends of the adjusting rods F, and G, and respectively engage the heads $h^{11}$ so that movement of the rods F or G in either direction acts to shift the corresponding head outwardly or inwardly bringing the teeth on said head into positive engagement with the teeth on said ratchet bar and shifting the adjusting roller thereby.

The operation is as follows: When in operation for instance in the mangle shown, the material is fed into and through the mangle at the cylinder A and returns beneath said cylinder in the direction shown by the arrow in Fig. 1 firmly engaged against said cylinder by the belt $c$, and passing upwardly over the pulley or roller C', passes downwardly again between the belts $c$ and $e$, and thence is delivered around the pulley $c^2$, between said belt and outwardly over the pulley $e^2$. Should said belts or aprons vary to any appreciable extent or begin to run untrue upon their rollers, the outward movement of the belt occasioned thereby in either direction, acts to shift the rods F or G transversely the machine bringing the corresponding shoes $g$—$g'$ or $f$—$f'$ into engagement and swinging the head $h^{11}$ corresponding with the rod F or G, into engagement with the teeth on the ratchet bar $H^2$ or $H^3$ and in consequence inasmuch as said heads $h^{11}$ are constantly reciprocated under the action of the bell crank, such engagement must of necessity result in pushing the slide-bearing for the corresponding adjusting roller longitudinally the frame bar $D^2$ thus varying the angularity of said adjusting rolls relatively the belt or apron thereby guiding the same true upon the rollers or pulleys. The adjusting rollers must of course remain in this position until its adjusting rod F or G is again actuated either in the same or in the opposite direction resulting in the characteristic shifting of the head to appropriately engage said ratchet bar producing corresponding adjustment of the adjusting rolls. Furthermore the adjusting mechanism is employed only on one side of the apron or belt inasmuch as a shoe is secured on the respective thrust rod on each side of the belt or apron, either of which are contacted by the belt should it run out of true on either side thus operating the head "$h^{10}$" to engage the appropriate side of the toothed bar for shifting the roller in either direction to vary the angle for adjusting the apron into true position.

It is evident that by this mechanism the utmost nicety of adjustment and accurate guidance of the belts or aprons is attained and of course the mechanism may be applied to belts or aprons of any size or kind and used for any purpose and any suitable mechanism may be applied to continuously reciprocate the heads to enable the adjustment to be made. I therefore do not purpose limiting this application for patent otherwise than necessitated by the prior art as many details of construction and arrangement may be varied without departing from the principles of my invention.

I claim as my invention:

1. A belt or apron guiding apparatus embracing a thrust rod movable transversely the belt or apron by engagement therewith when out of true, slide bars movable longitudinally the apron, a ratchet bar engaged thereon having serrated edges, a head operatively connected with the thrust rod and having teeth to engage the ratchets on the ratchet bar when the thrust rod is shifted, means reciprocating said head and a roller, bearing on the belt or apron, and connected with the slide bar and adapted for adjustment thereby to vary its angularity with the belt.

2. A belt or apron guiding apparatus embracing a thrust rod movable transversely the belt or apron, a slide bar movable longitudinally the apron, an inclined ratchet bar engaged thereon having serrated edges, a head operatively connected with the thrust rod and having teeth to engage on the ratchet bar when adjusted thereto by said thrust rod, means reciprocating said head and a roller, bearing on the belt or apron, and connected with the slide bar and adapted for adjustment to vary its angularity with the belt.

3. A belt or apron guiding apparatus embracing a thrust rod movable transversely the belt or apron by engagement with its edges, a slide bar movable longitudinally the apron, a ratchet bar engaged thereon and directed obliquely with the belt and having serrated edges, a head connected with the thrust rod and having teeth to engage on the ratchet bar when adjusted thereto by the thrust rod, a bell crank reciprocating the said head, a roller bearing in the belt or apron, and positively connected with the slide bar and adapted for adjustment to vary the angularity with the belt.

4. A belt or apron guiding apparatus embracing a thrust rod or adjusting rod movable transversely the belt or apron, slide bars movable longitudinally the apron, a ratchet bar having serrated edges engaged thereon, a head operatively connected with the adjusting bar and having teeth to engage on the ratchet bar when adjusted by the adjusting bar, means reciprocating said head and a roller bearing on the belt or apron and connected with the slide bars and adapted for adjustment to vary the angularity with the belt.

5. In a mechanism of the class described a belt, a roller engaging the same and adjustable thereto obliquely, a slide bar secured on the frame and positively connected with the bearing for the adjusting roller, a serrated bar connected with the slide bar, a continuously reciprocating head engaged thereon for engagement with the serrated bar and means operated by the belt for adjusting said head into or out of engagement with said serrated bar.

6. In a device of the class described the combination with a belt of an adjusting roller contacting the same, a slide connected with said roller, a bar having teeth on each side rigidly secured to the slide, a pivotally supported rod, means pivotally supported by the rod to engage the teeth on either side of the bar and constantly reciprocating mechanism adapted to operate the said means to engage the toothed bar on the slide to shift the adjusting roller.

7. In a device of the class described the combination with a belt or apron of an adjusting roller therefor, a housing supporting a bearing of said roller movable longitudinally of the belt, a slide, a bar rigidly connecting the same with the housing, constantly reciprocating mechanism, means rigidly secured to the slide adapted for engagement by the constantly reciprocated mechanism, and mechanism operated by movement of the belt or apron for actuating said constantly reciprocated mechanism to engage said means thereby shifting the adjusting roller.

8. In an automatic belt or apron shifting device the combination with an adjusting roller of movable means connected with said roller, reciprocating mechanism adapted to engage the movable means by the shifting of the belt to automatically shift the adjusting roller to return the belt or apron to true position, and a rod pivotally supporting the reciprocating mechanism in operative relation with the movable means.

9. In an automatic belt or apron truing mechanism the combination with an adjusting roller, a slide connected with the roller, a bracket on said slide, a toothed bar rigidly secured on the bracket, movable mechanism having teeth normally out of engagement with the toothed bar and mechanism shifted by the belt moving out of true to automatically throw the teeth in meshing engagement thereby varying the angularity of the adjusting roller relatively the belt or apron.

10. An automatic adjusting mechanism of the class described embracing adjustable rollers having frictional engagement with the belts or aprons to be adjusted, slides operatively connected with the roller, toothed bars on the slides, an oscillating lever, a plurality of bars reciprocated thereby, rods pivotally supporting said bars and heads on the bars adapted to engage and actuate the toothed bars on the slide varying the angularity of the roller with the belt or apron.

11. An automatic adjusting mechanism of the class described embracing adjustable rollers, adapted for frictional engagement with belts or aprons, an independent slide operatively connected with each roller, an oscillating lever, bars constantly reciprocated thereby, coacting means on each bar and the respective slide normally out of operative relation and independent mechanism for each belt shifted by movement of the belt or apron out of true to throw said coacting means appropriated thereto into operative relation thereby shifting the adjusting roller for returning the belt to adjustment.

12. In a device of the class described the combination with a frame, a rod pivotally supported therefrom, an adjusting roller, movable means connected therewith, a movable bar, coacting mechanism thereon and on the movable means normally out of operative relation, means pivotally connecting the pivotal rod and the movable bar to actuate the bar to throw said coacting means in operative relation and means adapted to be contacted by a belt moving out of true position to shift the rods.

13. In a device of the class described the combination with a frame, pulleys journaled thereon, belts trained around said pulleys, adjusting rollers one in contacting engagement with each belt, rods pivoted adjacent the belts, slides secured in ways in the frame, independent connections between the slides and appropriate adjusting roller, bars movable with the slides having teeth on each side, constantly movable means having teeth adapted to engage the teeth on the respective bar and means engaged on the respective rod adapted to be contacted by the respective belt as it shifts from true position in either direction.

14. In a device of the class described the combination with a frame, pulleys journaled thereon, belts trained around said pulleys, adjusting rollers one in contacting engagement with each belt, rods pivoted adjacent the belts, slides secured in ways in the frame, independent connections between the slides and appropriate adjusting roller, bars movable with the slides having teeth on each side, constantly movable means having teeth adapted to engage the teeth on the respective bar, means engaged on the respective rods adapted to be contacted by the respective belt as it shifts from true position in either direction, a bell crank lever operatively connected with said constantly movable means and eccentrically operated means for actuating the bell crank lever.

15. In a device of the class described the combination with a frame of pulleys journaled thereon, belts trained around the pulleys, adjusting rollers one for each belt and in frictional engagement therewith, rods, one adjacent and extending transversely of each belt, bars pivotally connecting the same to the frame, shoes on said rod at each edge of the belt adapted to be contacted as the belt shifts out of true position, reciprocating rods, means connecting the same to the appropriate bar and operative mechanism between each reciprocating rod and the respective adjusting roller.

16. In a device of the class described the combination with a frame of pulleys journaled thereon, belts trained around the pulleys, adjusting rollers, one for each belt and in frictional engagement therewith, rods, one adjacent and extending transversely of each belt, bars pivotally connecting the same to the frame, shoes on said rods at each edge of the belt adapted to be contacted as the belt shifts out of true position, reciprocating rods, means connecting the same to the appropriate bar, operative mechanism between each reciprocating rod and the respective adjusting roller, means pivoted to the frame connected with the corresponding ends of the reciprocating rods for actuating the same and an eccentric for actuating said means.

In testimony whereof I have hereunto subscribed my name in the presence of two subscribing witnesses.

SIVERT MOE.

Witnesses:
K. E. HANNAH,
J. W. ANGELL.